Oct. 13, 1936.　　　M. NYSTROM　　　2,057,107
PHONOGRAPH
Filed Oct. 22, 1930　　9 Sheets-Sheet 1
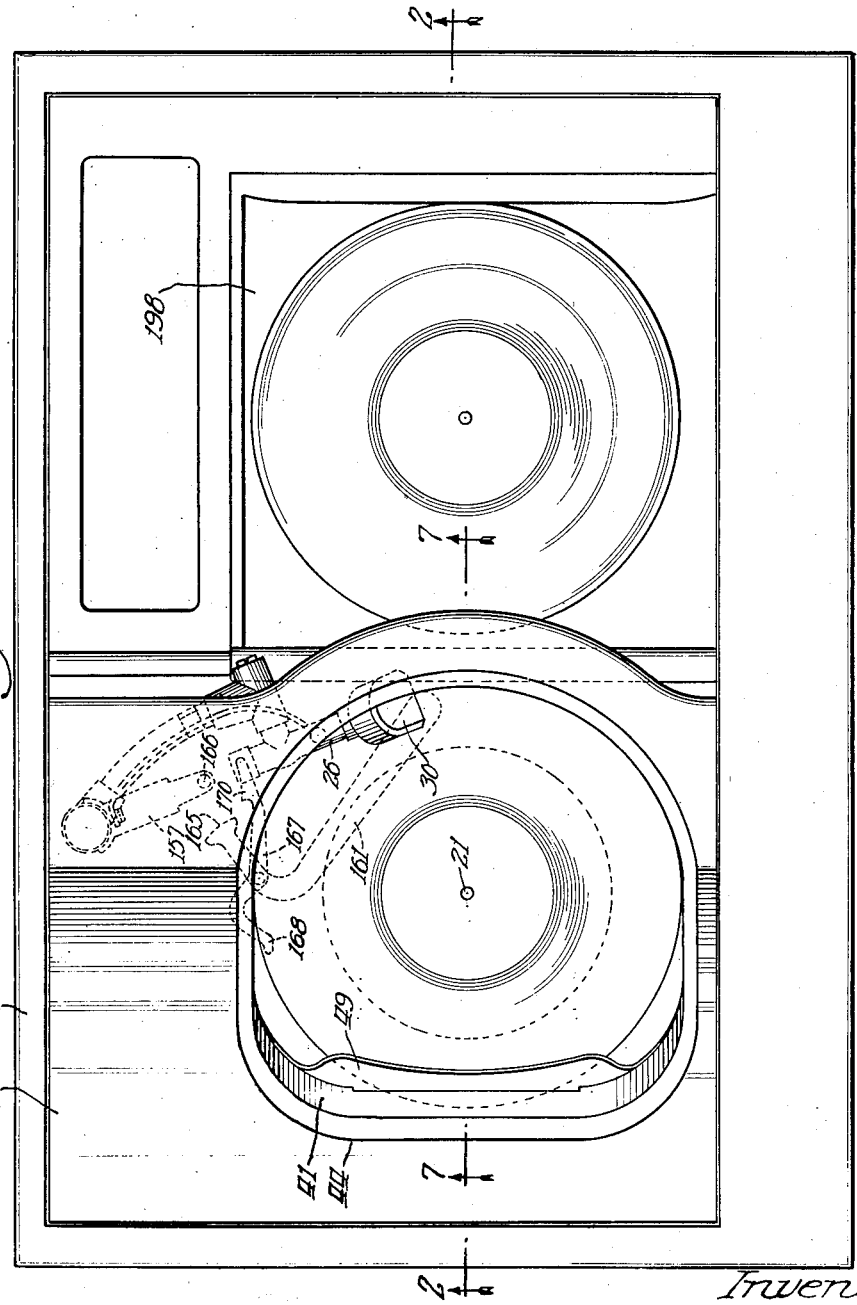
Inventor
Martin Nystrom

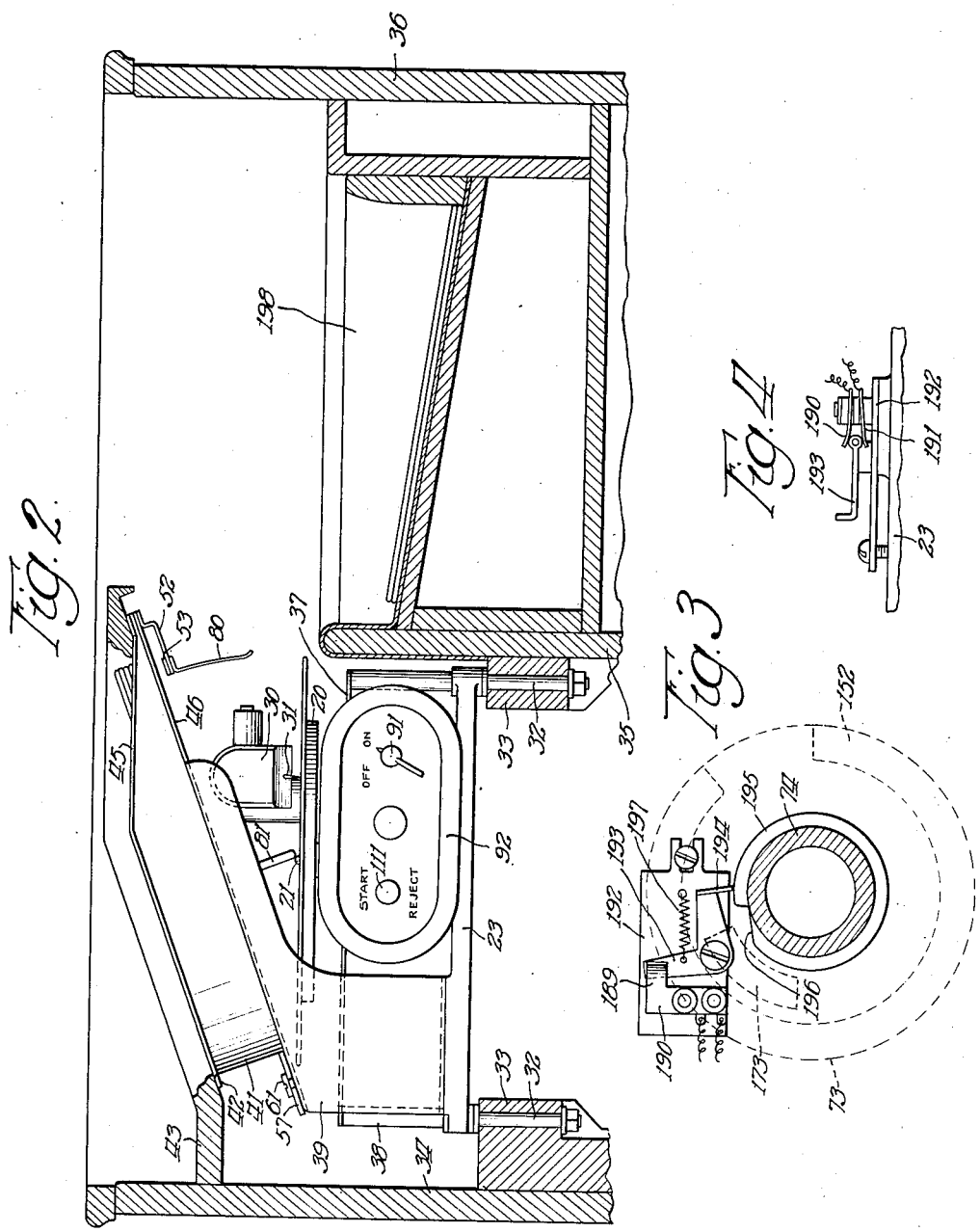

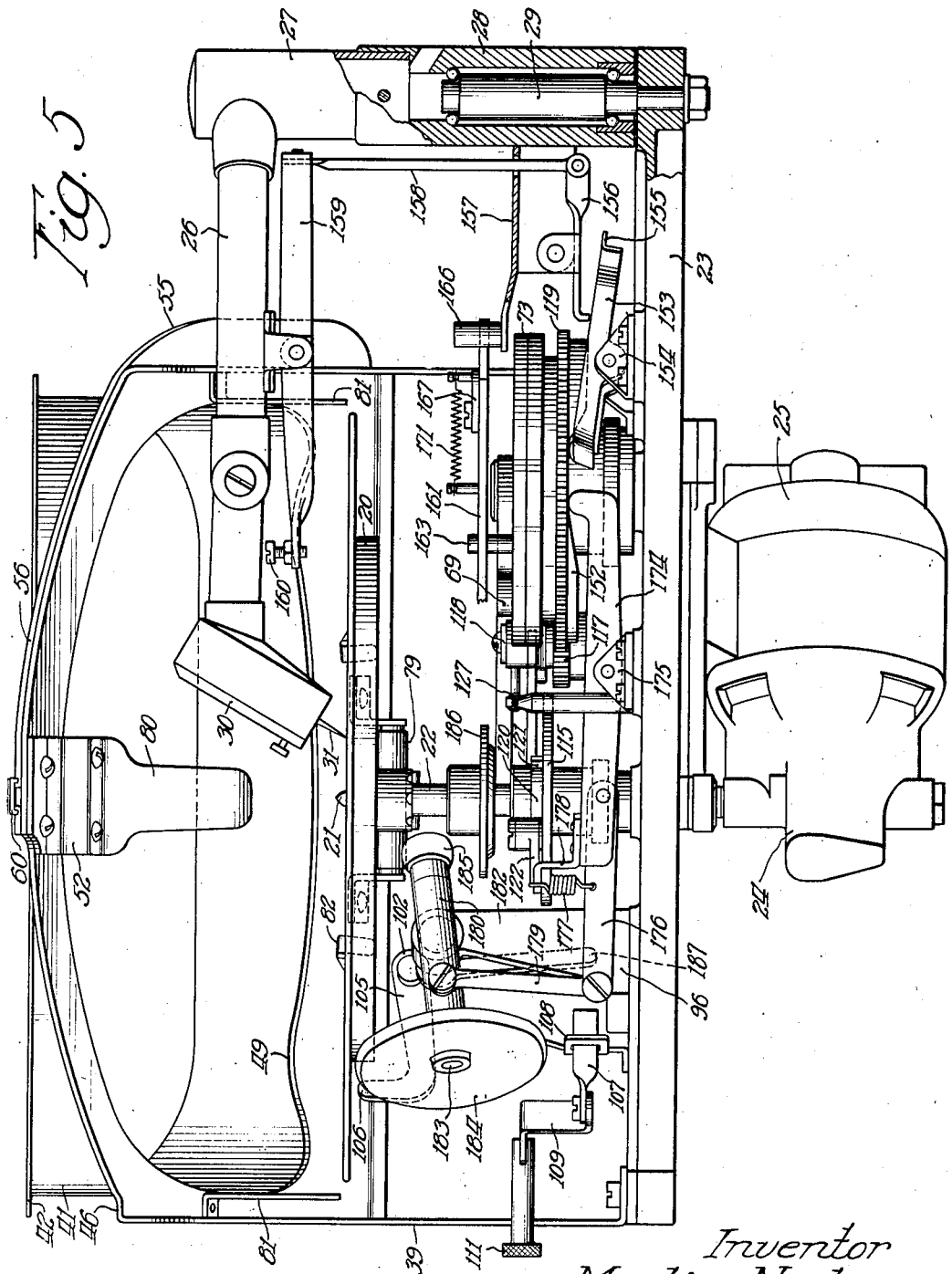

Oct. 13, 1936.  M. NYSTROM  2,057,107
PHONOGRAPH
Filed Oct. 22, 1930  9 Sheets-Sheet 4

Inventor
Martin Nystrom
By Tindall Parker Carlson
Attys.

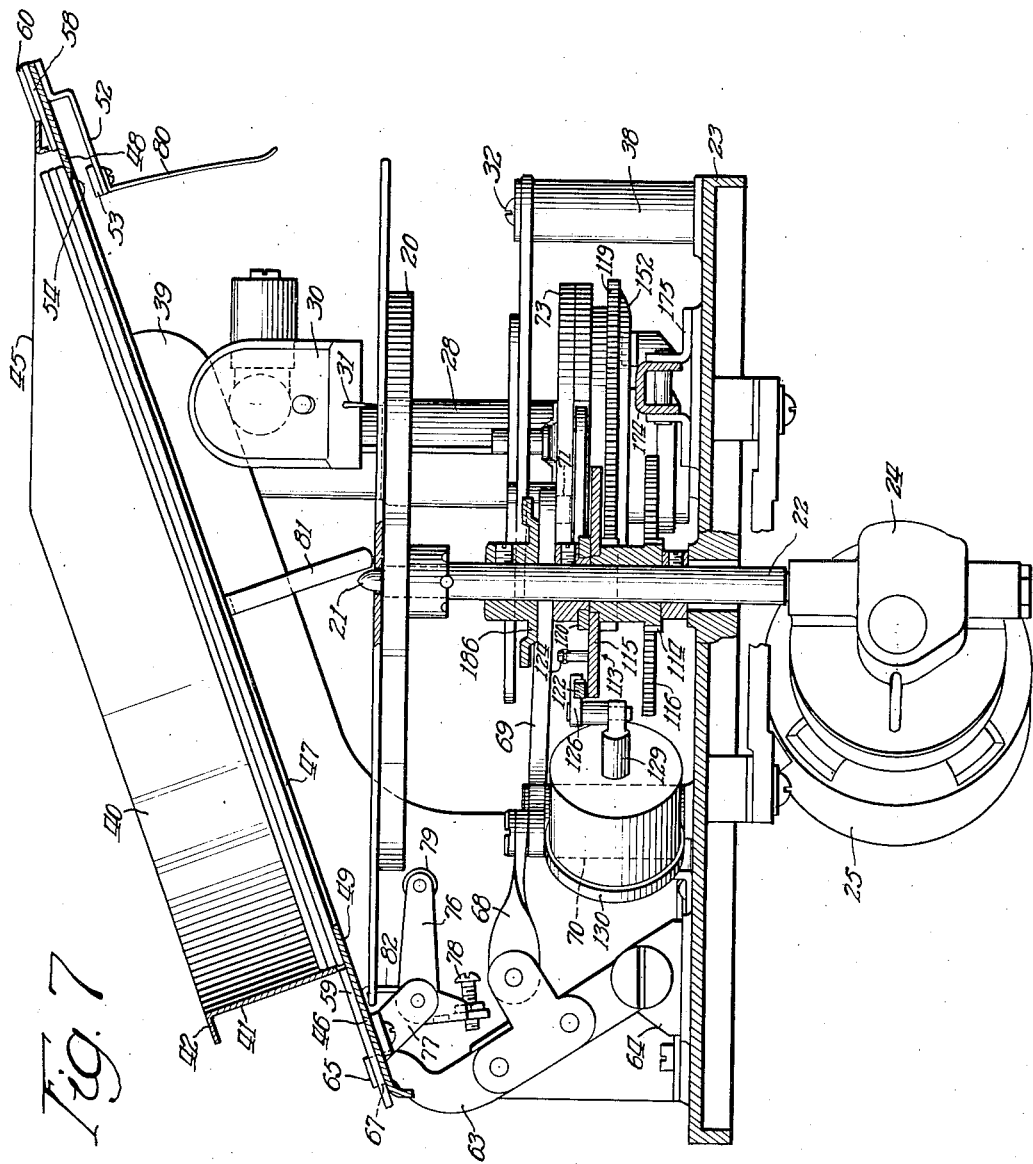

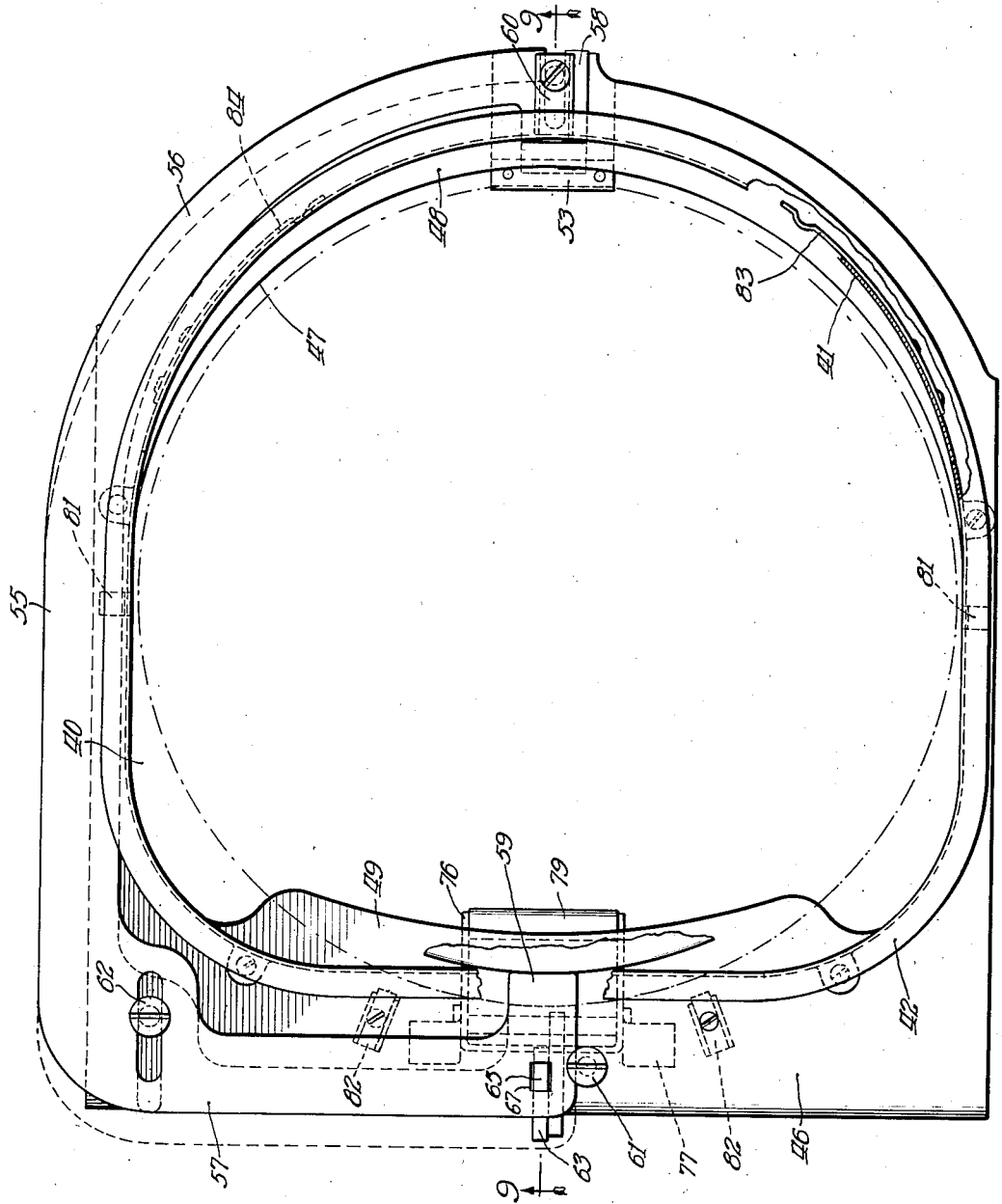

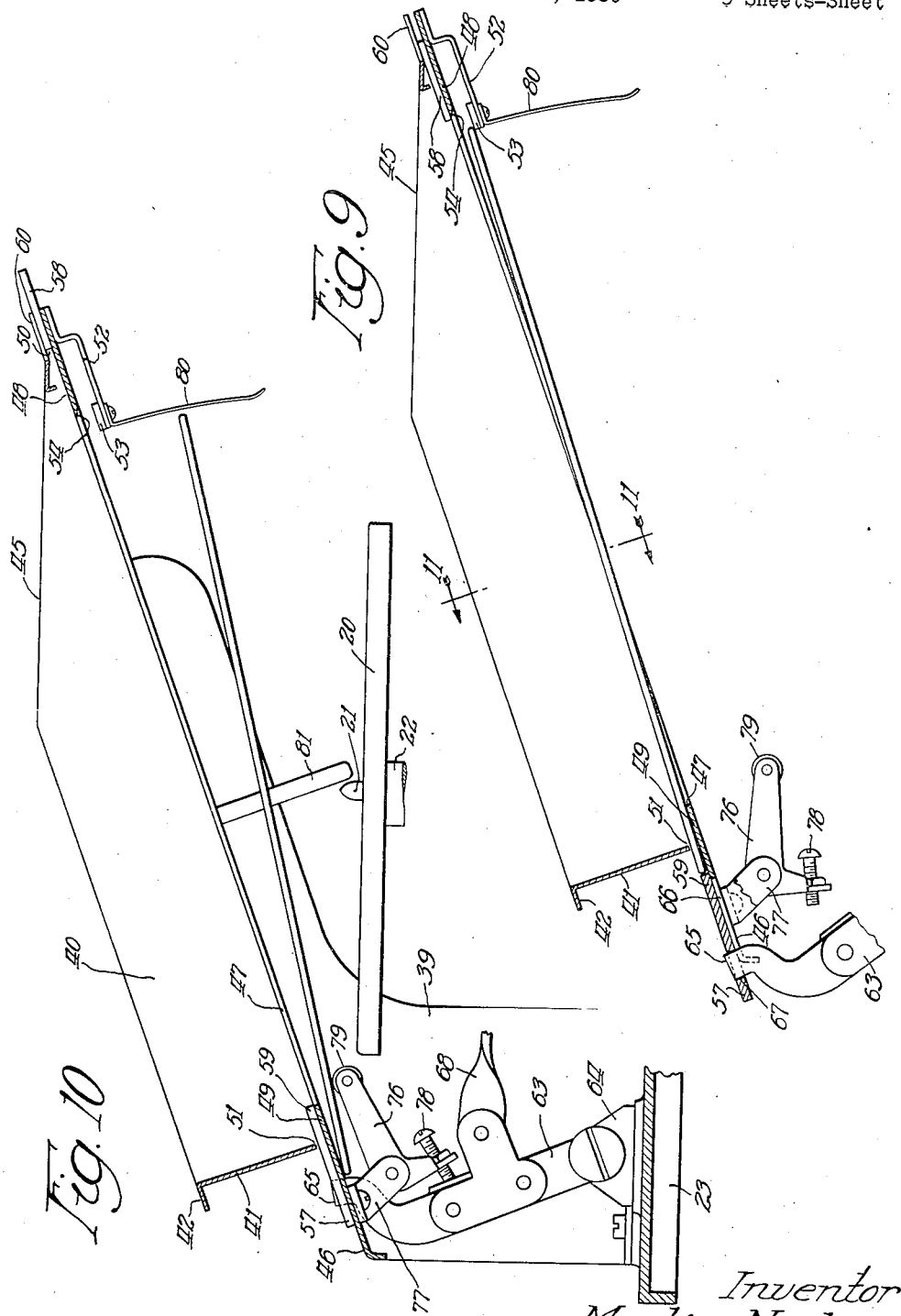

Oct. 13, 1936.                M. NYSTROM                2,057,107
                              PHONOGRAPH
                         Filed Oct. 22, 1930         9 Sheets-Sheet 8
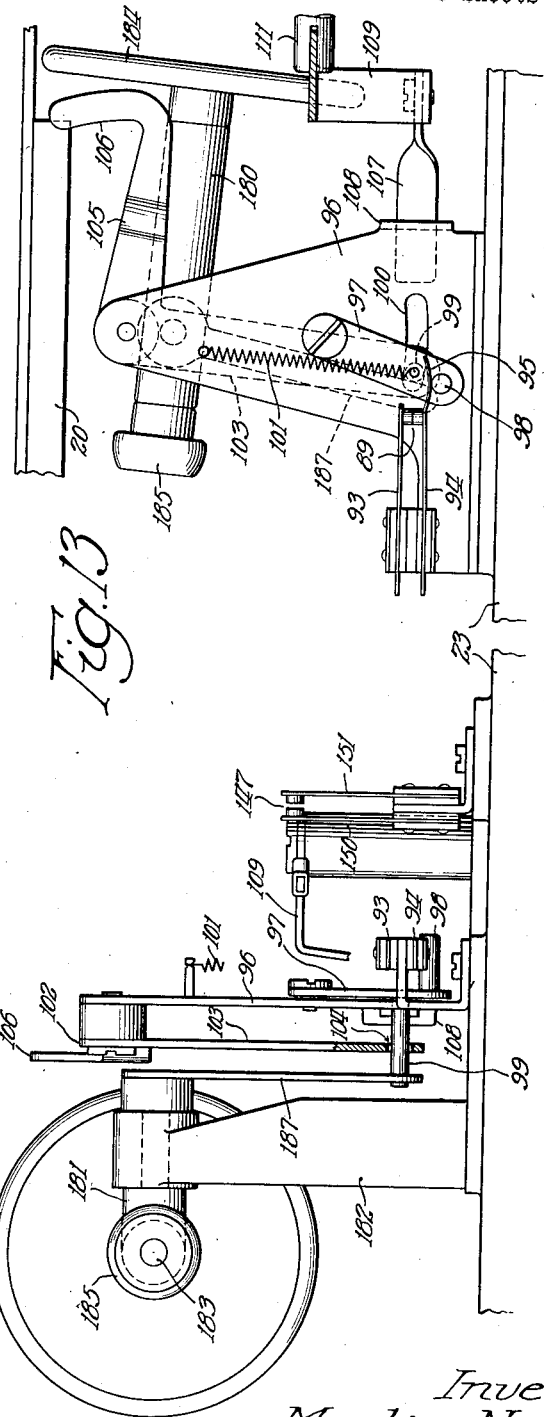
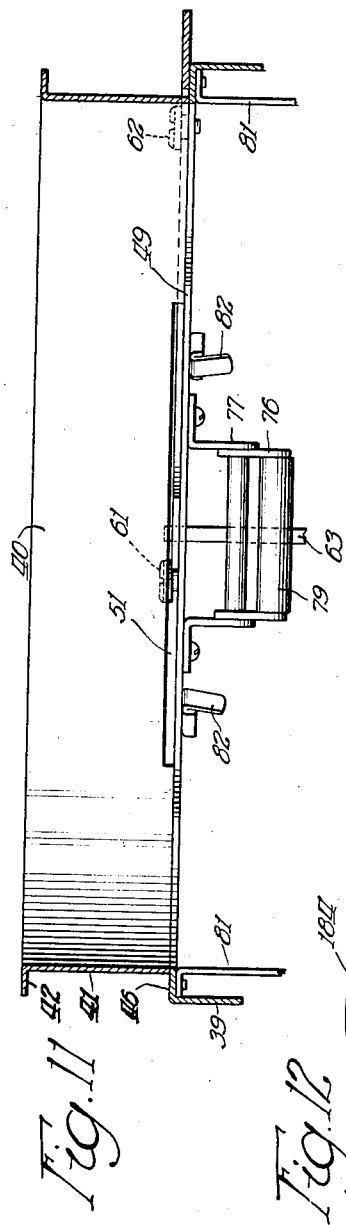
Inventor
Martin Nystrom
By Chindahl Parker & Carlson
Attys.

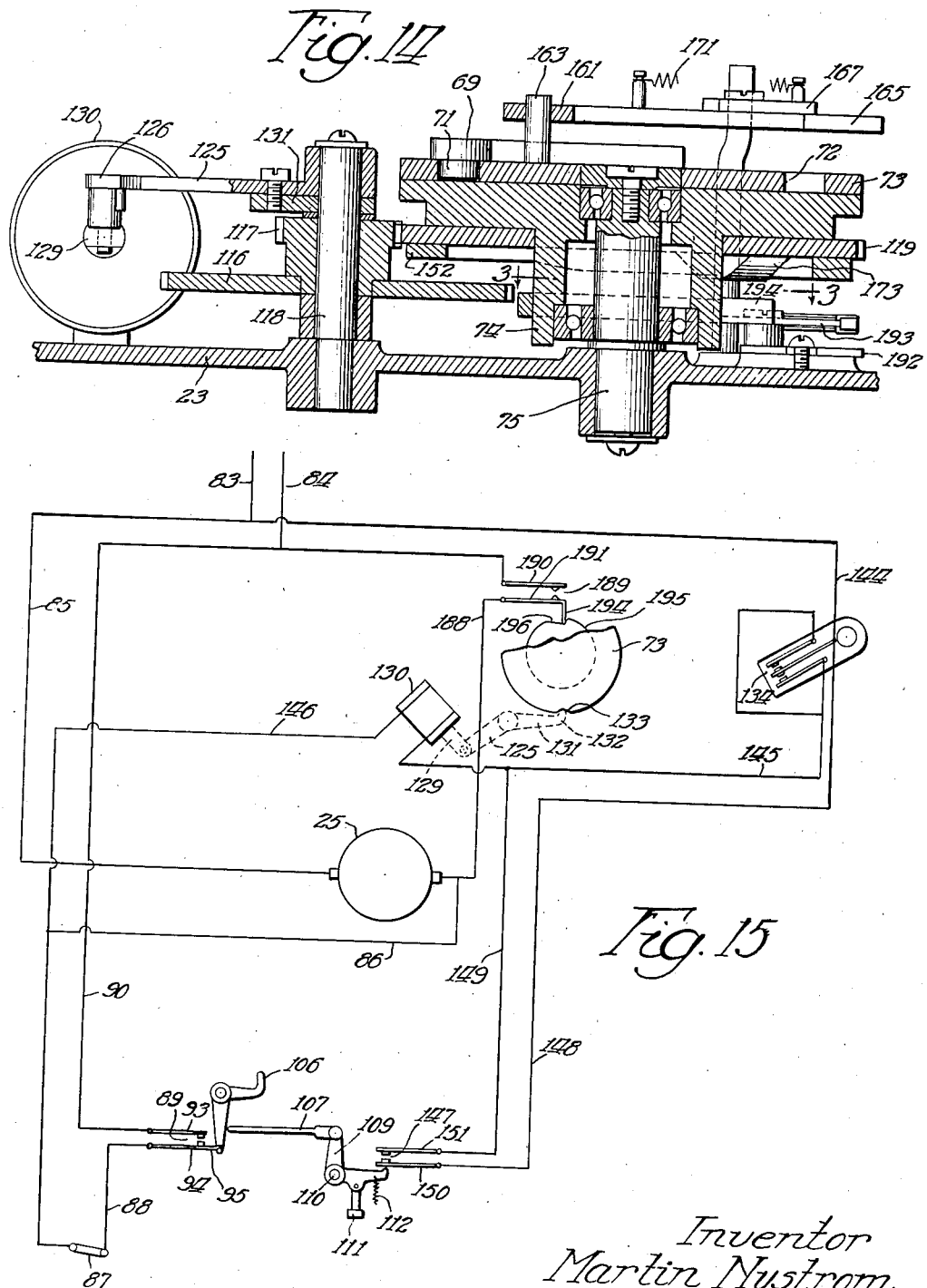

Patented Oct. 13, 1936

2,057,107

UNITED STATES PATENT OFFICE 2,057,107

PHONOGRAPH

Martin Nystrom, Chicago, Ill., assignor to United Research Corporation, Long Island City, N. Y., a corporation of Delaware Application October 22, 1930, Serial No. 490,416

6 Claims. (Cl. 274—10)

The present invention relates to improvements in phonographs, and more particularly to phonographs capable of automatically playing a plurality of disk records in succession.

One of the objects of the invention resides in the provision of a new and improved magazine for supporting the records to be played.

Another object is to provide novel means for transferring the records one by one from the magazine onto the turntable.

A further object is to provide means of the foregoing character the operation of which is adapted to be instituted either automatically upon completion of the playing of a record or manually at will, and in timed relation to means for discharging the record from the turntable and means for returning the stylus to initial playing position.

A general object resides in the provision of novel means for positioning records from a stack one by one onto the turntable which means is accurate, reliable and fool-proof in operation, and simple and compact in construction.

Further objects and advantages will become apparent as the description proceeds.

In the accompanying drawings, Figure 1 is a plan view of a phonograph embodying the features of my invention.

Fig. 2 is a vertical sectional view through the phonograph cabinet taken along line 2—2 of Fig. 1, and showing the operating mechanism in front elevation.

Fig. 3 is a detail horizontal sectional view taken along line 3—3 of Fig. 14, and showing one of the control switches in plan.

Fig. 4 is a fragmentary side view of the switch shown in Fig. 3.

Fig. 5 is a side elevational view of the operating mechanism of the phonograph.

Fig. 7 is a vertical sectional view through the operating mechanism taken along line 7—7 of Fig. 1.

Fig. 8 is a plan view on an enlarged scale of the record magazine.

Fig. 9 is a vertical sectional view taken along line 9—9 of Fig. 8, and showing the operating parts in one position.

Fig. 10 is a view similar to Fig. 9, but showing the operating parts in another position.

Fig. 11 is a sectional view taken along line 11—11 of Fig. 9.

Fig. 12 is a detail end elevational view of the record discharging means.

Fig. 13 is a side view of the record discharging means shown in Fig. 12.

Fig. 14 is a fragmentary vertical sectional view taken along line 14—14 of Fig. 6.

Fig. 15 is a diagrammatic representation of the control circuits.

Figure 6:
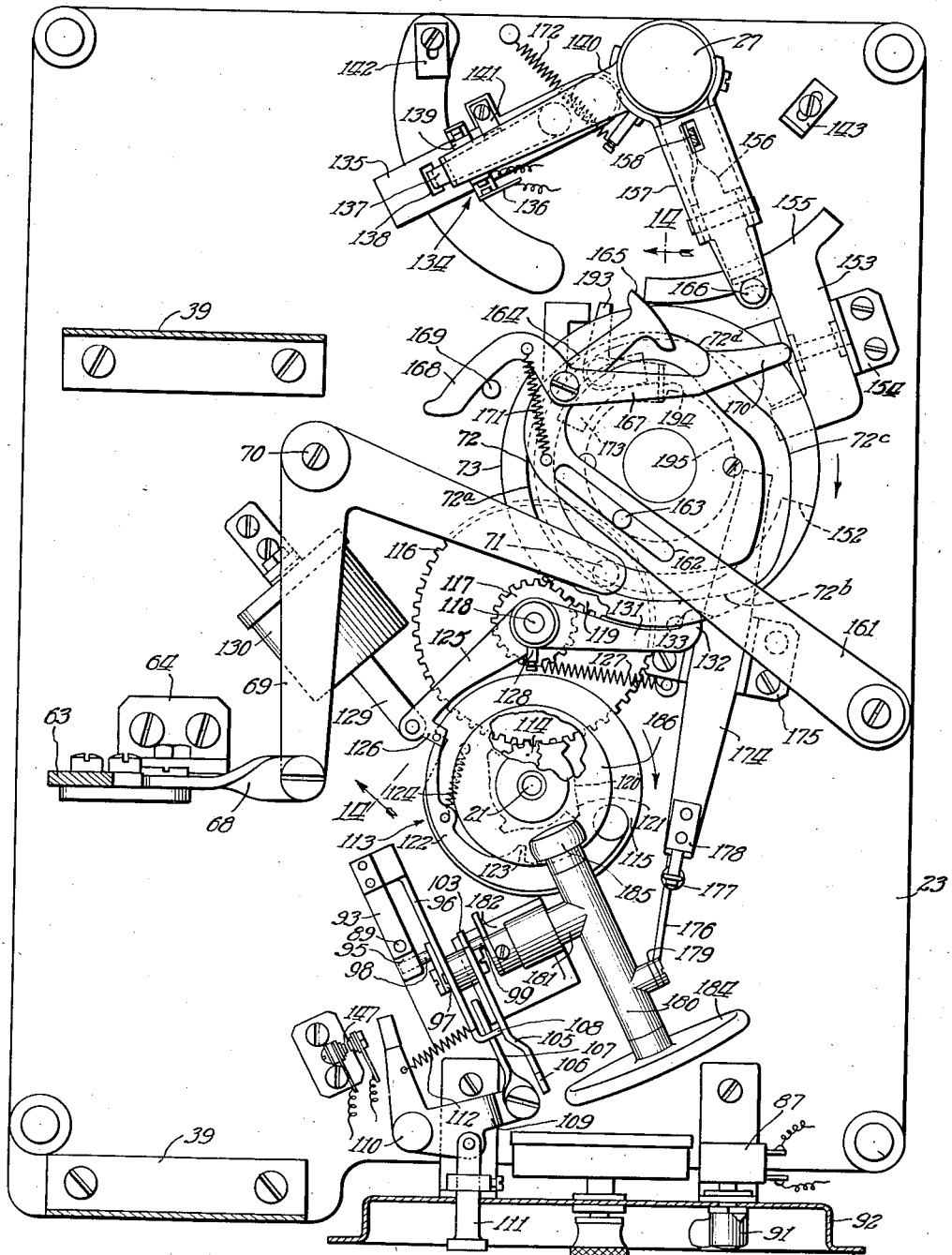
Fig. 6 is a plan view of the operating mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention comprises a suitable horizontal rotatable support or turntable 20 with an upstanding axial centering pin 21. The turntable 20 is secured to the upper end of a vertical drive spindle 22 (see Figs. 5 to 7) which is suitably journaled in and extends through a frame plate 23. The lower end of the spindle 22 is connected through a reduction gearing 24 to an electric motor 25 mounted on the underside of the frame plate 23.

Mounted for horizontal swinging movement over the turntable 20 is an arm 26, designated for convenience as a tone arm. The tone arm 26 comprises an upright hub portion 27 (see Fig. 5) which is rigidly connected to the upper end of a tubular post 28 journaled on a vertical shaft 29 fixed on the frame plate 23.

An electrical pickup 30 is pivotally mounted for vertical movement on the free end of the tone arm 26. Removably secured in the pickup 30 is a suitable stylus 31 for engaging the record groove.

The frame plate 23 may be supported in any suitable enclosure, and in the present instance is rigidly mounted by means of bolts 32 on spaced supports 33 secured respectively to opposed walls 34 and 35 in a cabinet 36 (see Figs. 1 and 2). A cover plate 37 is mounted through the use of spacers 38 on the extended upper ends of the bolts 32 in parallel spaced relation to the frame plate 23 just below the turntable 20 to enclose most of the parts of the operating mechanism.

The record magazine

The record magazine in its preferred form (see Figs. 7 to 11) comprises a frame or bracket 39, preferably U-shaped in form with the legs straddling the turntable 20 and resting on the frame plate 23. The top wall of the bracket 39 is extended over the turntable 20 and inclined upwardly therefrom, and constitutes the base wall of a record compartment 40 adapted to contain a stack of records. The compartment 40 comprises a peripheral side wall 41 conforming generally to the shape and size of the records, and having an outer peripheral flange 42 on its upper end. A cover board 43 forming part of the cabinet 36 rests on the flange 42, and is formed with an opening 44 conforming to the wall 41. Preferably, the upper end of the wall 41 is partially cut away obliquely as indicated at 45.

The base wall or shelf 46 of the compartment 40 is formed with an opening 47 which is coextensive in width with the space between the sides of the wall 41, and which terminates short of the ends of the wall 41 to define upper and lower ledges 48 and 49. The edge of the upper ledge 48 conforms approximately to the curvature of the records. Normally, the lower record when centrally disposed in the compartment 40 will rest at its upper and lower edges on the ledges 48 and 49, and will support the superimposed records of the stack.

Formed in the lower edge of the wall 41 respectively along the ledges 48 and 49 are two elongated notches defining opposed slots 50 and 51 substantially equal in width to the thickness of a record, and capable of receiving the edge of the lowermost record of the stack.

Secured to the underside of the base wall 46 and extending inwardly in parallel spaced relation to the upper ledge 48 is a secondary ledge 52. A suitable rest 53 is secured on the free end of the ledge 52, and extends inwardly beyond the overlying inner edge of the ledge 48.

Suitable means is provided for selectively displacing the lowermost record in order to release same from the ledges 48 and 49. In general, this means is effective to move the record downwardly along the base wall 46, the lower edge moving into the slot 51 and the upper edge moving off of the upper ledge 48, and then to move the record upwardly, the upper edge moving onto the rest 53 below the ledge 48 and the lower edge moving off of the lower ledge 49. In moving the record off the upper ledge 48, its upper edge sags, but preferably the inner edge of the ledge is chamfered on its underside as indicated at 54 to deflect the record downwardly if necessary so as to insure movement thereof upwardly onto the rest 53. As soon as the record has been moved off of the lower ledge 49, it will slide off of the rest 53 which is inclined downwardly, and will be directed by means hereinafter described onto the turntable 20.

In the present instance, the means for discharging the lowermost record from the magazine compartment 40 comprises a substantially U-shaped slide 55 mounted on the rear side of the base wall 46 outside of the peripheral wall 41. The slide 55 comprises upper and lower legs 56 and 57 extending about the upper and lower portions of the wall 41 to approximately the midpoints, and conforming substantially thereto in shape. Formed on the free ends of the legs 56 and 57 are two diametrically opposed selector fingers 58 and 59 which are reciprocable through the slots 50 and 51. The fingers 58 and 59 are spaced apart slightly more than the diameter of the records, and in their idle position terminate flush with the inside of the wall 41 and serve to hold the lowermost record in position on the ledges 48 and 49.

The upper finger 58 has an interfitting engagement with a guide 60 overlying same and secured to the base wall 46. A headed screw 61 secured to the base wall 46 engages the front edge of the lower finger 59 and serves to hold the latter against the base wall and to guide it in its reciprocatory movement. A headed pin and slot connection 62 is also provided between the base wall 46 and the slide 55. It will be evident that the guide 60, the screw 61 and the connection 62 serve to confine the slide 55 and the fingers 58 and 59 for reciprocatory movement on the base wall 46, the fingers being movable diametrically of the records.

Suitable means is provided for reciprocating the slide 55 and in the present instance this means (see Figs. 6, 10, and 14) comprises a lever 63 fulcrumed at its lower end in a bracket 64 on the frame plate 23, and having a toe 65 on its free upper end extending through a slot 66 in the base wall 46 into an aperture 67 in the lower leg 57 of the slide 55.

The lever 63 is connected intermediate its ends through a link 68 to one arm of a bell-crank lever 69 pivotally mounted on a post 70 on the frame plate 23. The other arm of the bell-crank lever 69 carries a depending cam follower pin 71 engaging in a continuous cam groove 72 formed in the upper surface of a circular cam plate 73. The latter has a depending hub 74 journaled through anti-friction bearings on a fixed vertical shaft 75 mounted on the frame plate 23. The cam groove 72 has a concentric dwell portion 72$^a$ extending through approximately 180° which serves to locate the fingers 58 and 59 in idle position, a portion 72$^b$ extending outwardly toward the edge of the plate 73 for moving the fingers downwardly until the upper finger 58 projects slightly beyond the inner edge of the upper ledge 48, a portion 72$^c$ extending inwardly to within the dwell portion 72$^a$ for moving the fingers upwardly until the finger 57 projects slightly beyond the inner edge of the lower ledge 49, and a portion 72$^d$ extending outwardly to the dwell portion 72$^c$ for returning the fingers downwardly to their idle dwell position. These cam portions are arranged to take effect in the order named upon rotation of the cam plate 73 in a clockwise direction as viewed in Fig. 6. When the cam plate 73 is in its idle inoperative position, the pin 71 is substantially at the end of the dwell portion 72$^a$, and is about to enter the portion 72$^b$.

Suitable means is provided for guiding the record after being discharged from the record compartment 40 and directing it accurately and centrally onto the turntable 20. Preferably, this means (see Figs. 7 and 11) comprises a double walled bell-crank lever 76 fulcrumed in a bracket 77 on the underside of the base wall 46. One arm of the lever 76 extends downwardly and carries an adjustable abutment screw 78 positioned for engagement by the lever 63 upon oscillation of the latter to displace the record from the lower ledge 49.

The other arm of the lever 76 normally is disposed horizontally, and carries a roller 79 adapted to be moved upwardly upon movement of the lever 63 against the screw 78 into position just below and slightly beyond the inner edge of the ledge 49 to receive the lower edge of the record when the latter is released from the ledge, and then to be moved downwardly upon reversing the oscillation of the lever 63 to lower the record onto the turntable 20.

It will be evident that after the record is removed from both ledges 48 and 49 it will rest temporarily on the rest 53 and the roller 79, and that the record upon engaging the roller will immediately slide downwardly off of the rest 53. Suitably spaced guides are provided for directing the fall of the record as it is lowered by the roller 79. In the present instance, a depending guide 80 is secured to the free end of the secondary ledge 52 flush with the inner edge of the rest 53. Two depending guides 81 are secured to the underside of the base wall 46 flush with the inner surfaces of the sides of the wall 41. Two other depending guides 82 are secured to the underside of the base wall 46 at opposite sides of the lever 63.

Suitable spring clips 83 and 84 are secured to the outside of the wall 41 and extend across the slot 50 respectively at opposite sides of the upper finger 58. These clips constitute safety means for holding the record against the lower finger 59, and thereby preventing the lower end of the record from falling below the top of the ledge 49 in the event that the upper edge of the record is not displaced from the upper ledge 48.

The operation will be evident from the foregoing, and briefly stated as as follows: The lowermost record is displaced downwardly over the lower ledge 49 and off of the upper ledge 48, then is moved upwardly onto the rest 53 and off of the bottom ledge 49. Upon leaving the ledge 49, the record falls onto the roller 79 and then slides off of the rest 53 between the bottom ledge and the roller whereby it is supported over the turntable 20. The roller 79 then is lowered to drop the record onto the turntable, and the guides 80, 81, and 82 direct the fall of the record to bring the center aperture into engagement with the centering pin 21. In moving onto the centering pin, the record is adjusted into its final position. After the lowermost record is discharged, the next record of the stack assumes the lowermost position and is held in place by the fingers 58 and 59 until the next operation is instituted. It will be understood that the discharge of the record from the magazine is timed with respect to the removal of any record that might be on the turntable 20 and with respect to the movement of the tone arm 20 and the pickup 30.

*Driving mechanism*

The motor 25 for driving the spindle 22 may be connected to any suitable source of current, and in the present instance is adapted to be connected across two main line terminals 83 and 84, (see Fig. 15) the circuit leading from the terminal 83 through a line 85, the motor 25, a line 86, a hand switch 87, a line 88, a switch 89 and a line 90 to the terminal 84. Both switches 87 and 89 are mounted on and suitably insulated from the frame plate 23. The switch 87 may be of any suitable type, and is provided with a hand actuator 91 extending to the front of a control panel 92 (see Figs. 2 and 16) which is secured to the front end of the frame plate 23.

The switch 89 (see Figs. 12 and 13) is adapted to be closed automatically when a record is positioned on the turntable 20. Preferably, the contacts of the switch 89 are mounted in opposed relation on two parallel, vertically spaced spring arms 93 and 94. The free end of the lower arm 94 extends substantially beyond the contacts to provide a curved cam finger 95. The arms 93 and 94 are mounted on and insulated from the base of an upstanding bracket 96 on the frame plate 23.

The means for closing the switch 89 preferably comprises a lever 97 pivoted at its upper end on the bracket 96, and carrying a pin 98 on its free end movable into and out of engagement with the underside of the finger 94, and serving when in engagement with the finger to hold the switch contacts in engagement. The limits of oscillation of the lever 97 are defined by a pin 99 projecting therefrom freely into an arcuate slot 100 formed in the bracket 96. A coiled tension spring 101 anchored at its ends respectively to the bracket 96 and the pin 99 tends to hold the lever 97 in one extreme position or the other.

Pivotally mounted on the upper end of the bracket 96 is a bell-crank lever 102 having a depending arm 103 with a longitudinal slot 104 in the free end receiving the pin 99, and a substantially horizontal arm 105 on its upper end. The free end of the arm 105 is bent up to provide a finger 106 which is positioned at one side of the turntable 20, and adapted to extend above the latter when the switch 89 is open. It will be evident that when a record is positioned on the turntable 20, the record will engage and depress the finger 106, thereby oscillating the lever 102 to close the switch 89, and that the spring 101 passing across the pivot of the lever 97 will thereupon act to maintain the switch closed.

Manually operable means also is provided for closing the switch 89, and in the present instance (see Figs. 5 and 6) comprises a bar 107 slidably disposed in a slotted lug 108 on one side of the bracket 96 for movement into engagement with the lower end of the arm 103. The outer end of the bar 107 is pivotally connected to one arm of a bell crank lever 109 pivotally mounted on a post 110 on the frame plate 23. A push button 111 slidably mounted in the panel 92 for manual actuation is pivotally connected to the same arm of the lever 109. A coiled tension spring 112 anchored at its ends respectively to the other arm of the lever 109 and the bracket 96 tends to urge the button 111 outwardly, and to hold the bar 107 away from the arm 103. The button 111 is actuated to close the switch 89 to institute operation of the phonograph when there is no record on the turntable 20.

The cam plate 73 constitutes a unitary driving element which is adapted to be rotated periodically through one complete revolution to actuate the means for transferring records onto the turntable 20 as already described, and also to actuate various means for elevating and lowering the pickup 30, swinging the tone arm 26, and ejecting records from the turntable.

The cam plate 73 may be connected to any suitable source of power, and preferably is adapted to be connected through a suitable clutch 113 (see Figs. 5 to 7) to the drive spindle 22 for the turntable 20. To this end, a pinion 114 rigid on its upper end with a circular clutch plate 115 is freely rotatable on the spindle 22. The pinion 114 meshes with a gear 116 rigid with a concentric pinion 117 freely rotatable on a fixed stud 118 on the frame plate 23. The pinion 117 meshes with a large gear 119 rigidly secured on the hub 74 against the underside of the cam plate 73.

A clutch element 120 having a plurality of peripherally spaced ratchet teeth 121 is rigidly secured to the spindle 22 directly over the clutch plate 115. Pivotally mounted at one end on the plate 115 for movement therewith is an arcuate clutch shoe 122 having a tooth 123 movable into and out of position for engagement by one of the teeth 121 to connect the drive to the pinion 114. A coiled tension spring 124 connected to the plate 115 and the free end of the shoe 122 tends to swing the latter inwardly to establish this connection.

Pivotally mounted on the stud 118 is a lever 125 which is formed on its free end with a lug or toe 126 movable into and out of the path of the free end of the clutch shoe 122. A coiled tension spring 127 anchored to the frame plate 23 and connected to a pin 128 on the hub of the lever 125 tends to move the toe 126 into the path of the shoe 122. The free end of the lever 125 is also pivotally connected to an armature 129 reciprocable in a solenoid 130 mounted on the frame plate 23. It will be evident that upon excitation of the solenoid 130, the toe 126 will be withdrawn out of engagement with the shoe 122. Thereupon, the tooth 123 will be engaged by the clutch element 120, and the drive connection from the spindle 22 to the cam plate 73 will be established.

A locking lever 131 is mounted on the stud 118 and is rigidly connected to the lever 125 for movement therewith. The lever 131 is formed on its free end with a rounded toe 132 adapted to seat in a notch 133 formed in the periphery of the cam plate 73 when the latter is in idle position. Upon completing the drive connection to the cam plate 73, the free end of the clutch shoe 122 will immediately pass the toe 126 thus rendering the latter ineffectual to open the clutch 113 for at least one revolution of the plate 115. In the rotation of the cam plate 73 during the first part of this interval, the notch 133 will immediately force the toe 132 outwardly to lock the lever 125 in inoperative position so that even though the solenoid 130 is then deenergized, the cam plate will be driven through one complete revolution. At the end of the revolution, the toe 132 under the influence of the spring 127 will snap into the notch 133, thus swinging the toe 126 into position to open the clutch 113.

Excitation of the solenoid 130 is controlled by a switch 134 responsive to the swinging movement of the tone arm 26, and more specifically adapted to be closed automatically when the tone arm 26 reaches its innermost position after playing of the record. The switch 134 may be of any suitable form, and preferably is of such construction that it will be closed either through coaction with a limit stop or through a reverse movement of the tone arm 26 under the influence of an eccentric groove in the record.

In the present instance, the switch 134 (see Figs. 6 and 15) comprises a base lever 135 resting on the frame plate 23, and fulcrumed at one end adjacent the post 28. Mounted on the free end of the lever 135 is a U-shaped clip 136 the side arms of which carry opposed switch contacts. A second lever 137 is fulcrumed at one end on the lever 135 adjacent the post 28. The free end of the lever 137 is struck downwardly and extends into a slot 138 formed in the free end of the lever 135. The slot 138 is of sufficient width to permit a limited relative movement between the levers 135 and 137.

An inverted U-shaped clip 139 is secured to the underside of the lever 137, and carries contacts on its depending legs adapted for engagement respectively with the contacts on the clip 136. A lateral arm 140 is rigidly secured to the post 28 to which the tone arm 22 is secured. The free end of the arm 140 is struck down and notched to embrace the lever 137. Mounted on the lever 135 is an upstanding leaf spring 141, the free end of which is positioned for engagement by one side of the lever 137 upon movement of the latter by the arm 140 with the tone arm 26 inwardly to resist closing of the switch 134.

A stop 142 adjustably mounted on the frame plate 23 is positioned to engage the lever 135 and thereby limit further movement of the latter with the tone arm 26 inwardly when the stylus 31 reaches the inner end of the record groove, thus causing the switch 134 to close against the action of the spring 141. The lever 137 however is free to move in the opposite direction to close the switch 134, this movement being instituted upon moving the tone arm 26 outwardly, as for example through the action of an eccentric groove on the record after the record has been played. A fixed stop 143 on the frame plate 23 serves to limit the outward movement of the tone arm 26 and hence the switch mechanism.

The intermediate contacts of the switch 134 are connected through a common line 144 (see Fig. 15) to the terminal 83. The outer contacts are connected in parallel to a common line 145 leading to one terminal of the solenoid 130. Thus, the switch 134 preferably is of the double pole type.

Assuming the switch 89 to be closed due to the presence of a record on the turntable 20, closing of the switch 134 in either direction will close the following circuit through the solenoid 130: from the terminal 83 through the line 144, the switch 134, the line 145, the solenoid 130, a line 146, the switch 87, the line 88, the switch 89 and the line 90 to the terminal 84. Excitation of the solenoid 130 will cause the clutch 113 to close, thereby instituting operation of the cam plate 73 as heretofore described.

Suitable means is provided operable at will for closing a circuit for the solenoid 130 shunting the switch 134. This means (see Figs. 6, 12, and 15) is available to reject a record before it is played, or at any time during the playing, and also to institute the operation of the machine to play the first record of the stack, and preferably comprises a switch 147 operable from the panel 92. Of the switch 147, one contact is connected through a line 148 to the line 144 and the other contact is connected through a line 149 to the line 145. The contacts preferably are mounted on two spring arms 150 and 151.

The push button 111 at the front of the panel 92 is utilized as a means for closing the switch 147. To this end, one arm of the lever 109 extends across the contact arm 150 and is adapted to flex the latter to close the switch 147. It will be evident that the push button 111 is operable to simultaneously close the switches 89 and 147 to complete the motor circuit and the solenoid circuit even though no record is in position on the turntable.

*Means for elevating pickup*

The means for elevating and lowering the pickup 30 (see Figs. 5, 6, and 14) comprises an arcuate cam 152 formed on the underside of the gear 119. The ends of the cam 152 are beveled, and the lead end is adapted immediately upon rotation of the cam plate 73 to ride onto and depress one end of a lever 153 pivoted intermediate its ends in suitable brackets 154 on the frame plate 23. The other end of the lever 153 is formed with an arcuate plate 155 which underlies one end of a lever 156 pivotally mounted intermediate its ends in a lateral arm 157 rigid with the post 28. The other end of the lever 156 is connected through a vertical link 158 to the inner end of a lever 159 pivoted intermediate its ends on the underside of the tone arm 26.

The outer end of the lever 159 is provided with an adjustable rest 160 for elevating and supporting the pickup 30 while the cam 152 is in engagement with the lever 153. Upon movement of the cam 152 out of engagement with the lever 153 the pickup 30 is free to drop through its own weight to bring the stylus 31 into unrestrained engagement with the record groove.

Means for swinging tone arm

To swing the tone arm 26 into and out of playing position with the pickup 30 elevated, a lever 161 (see Figs. 5, 6, 7, and 14) is pivotally mounted at one end on the frame plate 23, and is formed intermediate its ends with an elongated longitudinal slot 162 in bearing engagement with an upstanding pin 163 mounted eccentrically on the cam plate 73. The free end of the lever 161 is formed with a laterally inclined extension 164 having an arcuate end face 165 movable upon oscillation of the lever 161 through rotation of the plate 73 into engagement with an upstanding pin 166 on the free end of the arm 157 to swing the tone arm 26 and the pickup 30 outwardly beyond the record.

Pivotally mounted intermediate its ends on the extension 164 is a lever 167 one end of which constitutes a cam arm 168 adapted to ride against a fixed pin 169 on the frame plate 23, and the other end of which is formed with a hook 170 for engaging the pin 166. A coiled tension spring 171 connected at its ends to the lever 161 and the lever 167 tends to hold the cam arm 168 yieldingly against the pin 169.

The parts are so formed and related that upon movement of the tone arm 26 outwardly beyond the record, the hook 170 will be moved into position to engage the pin 166, and that upon reversal of the lever 161 through the last half of the rotation of the cam plate 73, the hook 170 through engagement with the pin 166 will swing the tone arm 26 inwardly until the pickup 30 is located over the starting point of the record groove at which point the cam arm 168 will swing the hook 170 to release the pin 166. Thereupon, the stylus 31 will be free to travel inwardly along the record groove. Preferably, a tension spring 172 is provided tending to swing the tone arm 26 inwardly over the record.

Record discharging means

Means is provided for ejecting the record from the turntable 20 shortly after the pickup 30 has been elevated. This means (see Figs. 5, 6, 12, and 13) comprises a cam abutment 173 mounted on the underside of the gear 119 and inside of the cam 152. The cam abutment 173 is positioned to ride onto and depress one end of a lever 174 pivotally mounted intermediate its ends in a bracket 175 on the frame plate 23. The lever 174 preferably is U-shaped in cross-section. Pivoted in the outer end of the lever 174 and projecting therefrom is a lever 176. A coiled tension spring 177 anchored at its ends to a bracket 178 on the lever 174 and to the lever 176 tends to hold the latter against the lever 174. The free end of the lever 176 is connected through a vertical link 179 to a tubular sleeve 180 having a lateral boss 181 pivotally mounted on a bracket 182 on the frame plate 23.

Journaled in the sleeve 180 is a shaft 183. A friction roller 184 is mounted on the end of the shaft 183 adjacent the link 179, and is adapted to be elevated above the turntable to raise one edge of the record sufficiently to bring the central aperture above the centering pin 21. As a result, the turning force applied by the turntable 20 and the resisting frictional force applied by the roller 184 act on opposite sides of the record. The component of these forces serves to remove the record expeditiously and radially from the turntable 20.

Preferably, means is provided for rotating the roller 184 in a direction opposite to that of the record at the point of contact. This means comprises a friction roller 185 on the end of the shaft 183 opposite the roller 184. A friction disk 186 is secured to the spindle 22 for the turntable 20 in position for engagement by the roller 185 when the roller 184 is elevated to engage the record. The spring 177 serves to maintain a yieldable contact between the roller 185 and the disk 186.

Means, automatically operable when the roller 184 is elevated to discharge the record, is provided for opening the switch 89 in the motor circuit so as to stop the machine when the last record of the stack placed in the magazine has been played. This means (see Figs. 12 and 13) comprises a depending arm 187 secured to the boss 181 for movement therewith, and extending across the pin 99.

A shunt line 188 including a switch 189 (see Fig. 15) connecting the lines 86 and 90 across the switches 87 and 89 is provided for maintaining the motor circuit until the cam plate 73 has completed its revolution. The switch 189 comprises two spring contact arms 190 and 191 mounted on a bracket 192 on the frame plate 23. A lever 193 (see Figs. 3 and 4) pivotally mounted intermediate its ends on the bracket 192 has one end movable between the arms 190 and 191 to close the switch 189, and is provided on the other end with a finger 194 disposed in the path of a peripheral cam 195 on the hub 74 of the cam plate 73. The cam 195 defines a space 196 in which the finger 194 is disposed when the plate 73 is in its idle position. A spring 197 acting on the lever 193 tends to open the switch 189.

The lead end of the cam 195 is located to move immediately into engagement with the finger 194 to close the switch 189 upon initiating rotation of the cam plate 73 and before the record is ejected from the turntable 20. At the end of one complete revolution of the plate 73, the finger 194 will snap into the space 196, thereby opening the switch 189. If a new record has been positioned on the turntable 20, the switch 89 will again be closed, and the operation of the machine will continue. However, if the last record has been played, the switch 89 will remain open, and hence opening of the switch 189 will break the motor circuit to stop the machine.

Built into the cabinet 36 is a record discharge compartment 198 which is located to receive the records as the latter are discharged one by one from the turntable 20.

Résumé of operation

The operation will now be briefly described. Assuming that the machine is idle and that a stack of records has been placed in the record compartment 40, the hand switch 87 is closed.

Then, the button 111 is actuated to close the switch 89 and the switch 147, thereby establishing circuits for the motor 25 and the solenoid 130. Excitation of the solenoid 130 causes the clutch 113 to close, thereby instituting rotation of the cam plate 73.

Immediately upon rotation of the cam plate 73 out of its idle position, the lever 125 for opening the clutch 113 is locked in inoperative position, and the switch 189 is closed to maintain the motor circuit. The cam 52 elevates the stylus 31, and the eccentric pin 163 causes the tone arm 26 to be swung outwardly beyond the turntable 20.

The lowermost record now is positioned on the turntable 20, and depresses the toe 106 to close the switch 89 and thereby to establish the motor circuit during the playing of the record. After the record is positioned on the turntable 20, the tone arm 26 is swung inwardly into position over the initial starting point, the cam arm 168 acting to release the tone arm at this point. The stylus 31 then is lowered into engagement with the record groove. Shortly after the completion of the foregoing cycle of operations, the cam plate 73 completes one revolution whereupon the switch 189 is opened, and the lever 125 is released to open the clutch 113, thereby stopping the cam plate in its initial position.

The stylus 31 follows the course of the record groove to play the record, and causes the tone arm 26 to swing inwardly toward the center of the record. When the stylus 31 has traversed the full extent of the record groove, the switch 134 is closed automatically, either through engagement of the lever 135 against the stop 142 or through a reverse movement of the tone arm 26 resulting from an eccentric groove in the record to establish the circuit for the solenoid 130. If it is desired to reject the record before it is played or any time during the playing, the button 111 is actuated to close the switch 147 which will also close the circuit for the solenoid 130.

Excitation of the solenoid 130, through closing of either of the switches 134 and 147, serves to reinstitute the foregoing cycle of operations. In the course of this cycle of operations, the friction roller 184 is elevated to discharge the record on the turntable before the next record is positioned thereon.

The operation is automatically repeated until all of the records in the stack have been played. When the last record has been discharged from the turntable 20, the switch 89 remains open. As soon as the cam plate 73 completes its final revolution, the switch 189 is opened, and the machine comes to rest.

I claim as my invention:

1. In a phonograph, in combination, a horizontal turntable, a record compartment over said turntable having a base wall adapted to support a stack of records, said wall being formed with a discharge opening, a supporting flange underlying one edge of said opening, a roller movable vertically beneath the other edge of said opening, means for elevating said roller, releasing the lowermost record through said opening onto said flange and roller, and lowering said roller to lower said record onto said turntable, and spaced guides for guiding the fall of said record to direct same centrally onto said turntable.

2. In a phonograph, in combination, a record compartment having an inclined base wall adapted to support a stack of records, said wall being formed with an eccentric opening defining spaced upper and lower supporting ledges and having a horizontal dimension larger than the records, a slide reciprocable on said wall and having spaced fingers movable over said ledges diametrically of the records, a vertical lever engaging said slide, means for oscillating said lever to move said fingers first downwardly and then upwardly along said wall to release the lowermost record through said opening, and a record supporting lever pivotal upwardly by said first mentioned lever into position just below said lower ledge upon upward movement of said fingers to receive said record from said opening.

3. In a phonograph, in combination, a drive spindle, a record supporting turntable on said spindle, a record changing means, a switch cooperating therewith, a lever movable through an intermediate position in one direction to close said switch and in the other direction to open said switch, and spring means tending to hold said lever at one side or the other of said intermediate position, said lever having an arm extending to one side of said turntable for engagement by the underside of a record to close said switch when the record is positioned on said turntable.

4. In a phonograph, in combination, a vertical drive spindle, a record supporting turntable on said spindle, said turntable being smaller in diameter than said record, means for driving said spindle, said means including a circuit control switch, a support, a lever on said support pivotal in one direction to close said switch and in the other direction to open said switch, spring means tending to move said lever in one direction or the other, and a bell-crank lever on said support, said bell-crank lever having a depending arm operatively engaging said first mentioned lever and having a second arm extending to one side and above said turntable when said switch is open and adapted to be depressed through engagement with the underside of the record to effect closing of the switch.

5. In a phonograph, in combination, a rotatable record support, drive means for said support, a drive disk secured to said means, a bearing pivotally mounted below said support, a shaft journaled in said bearing, a friction roller on one end of said shaft adapted to be elevated into engagement with the underside of the record to lift one side thereof from said support upon pivotal movement of said bearing in one direction, a friction roller on the other end of said shaft movable into engagement with said disk upon movement of said first mentioned roller into record engaging position, and yieldable means for pivoting said bearing and holding said last mentioned friction roller against said drive disk.

6. In a phonograph, in combination, a rotatable record support, drive means for said support, a friction drive element, a shaft pivotally mounted below said support, a roller on said shaft adapted to be elevated into engagement with the underside of the record to lift one side thereof from said support upon pivotal movement of said shaft in one direction, a roller on said shaft movable into engagement with said element upon movement of said first mentioned roller into record engaging position, and cam actuated means including a lever having a yieldable connection for pivoting said shaft and pressing said last mentioned roller against said element.

MARTIN NYSTROM.